S. BIWOIN.
BABY CARRIAGE.
APPLICATION FILED OCT 13, 1919.
1,336,725.
Patented Apr. 13, 1920.
2 SHEETS—SHEET 1.
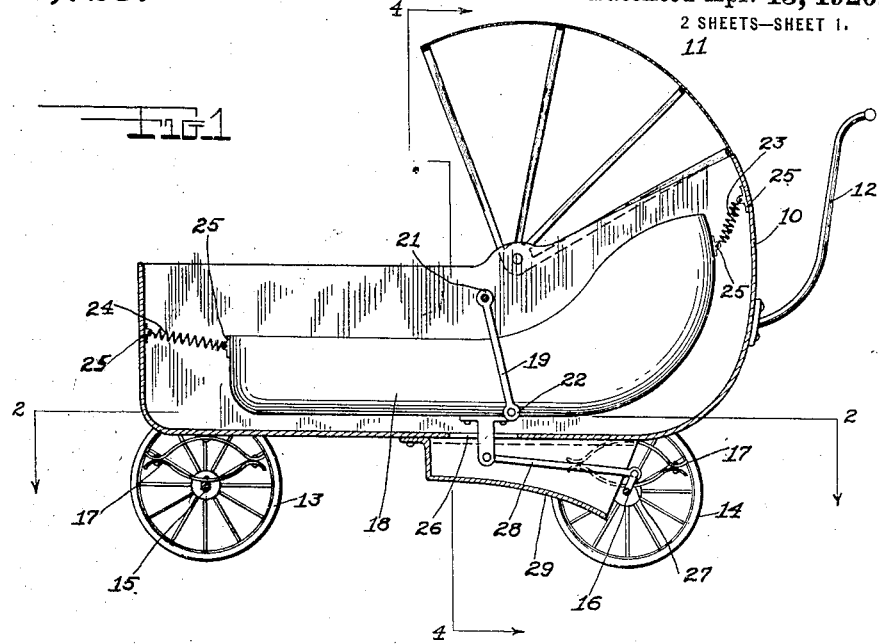
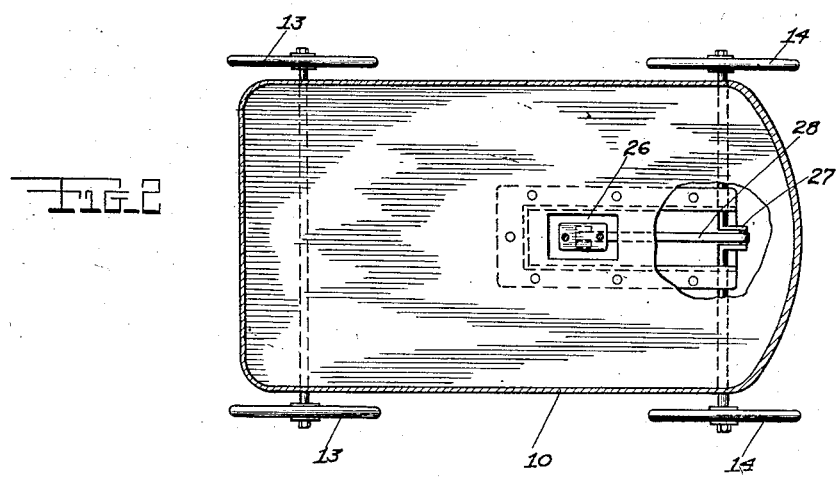
INVENTOR.
Stanley Biwoin
BY
ATTORNEY.

S. BIWOIN.
BABY CARRIAGE.
APPLICATION FILED OCT 13, 1919.
1,336,725.
Patented Apr. 13, 1920.
2 SHEETS—SHEET 2.
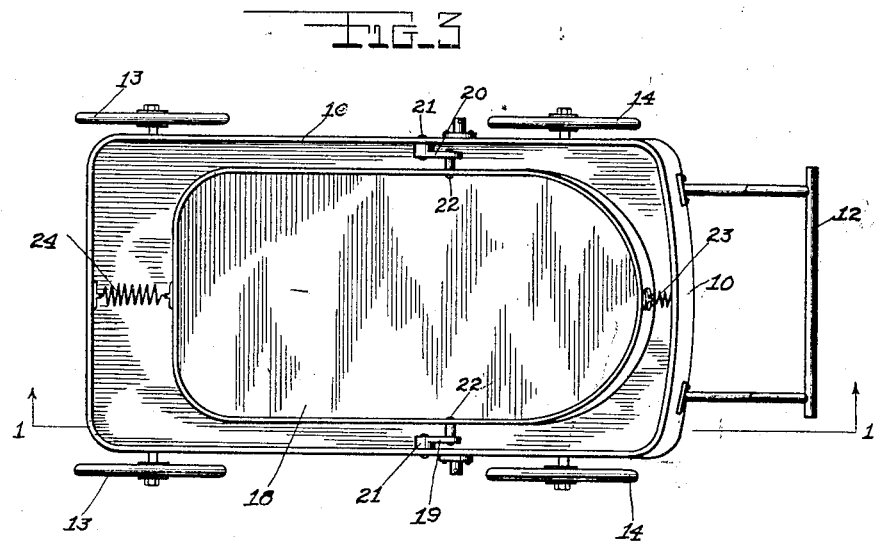
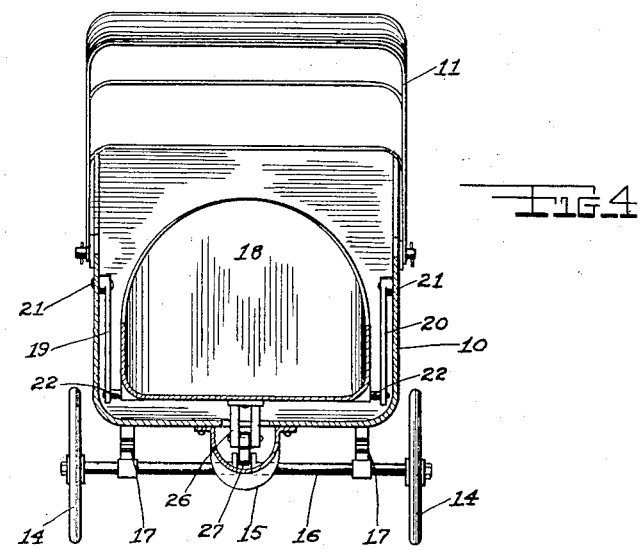
INVENTOR.
Stanley Biwoin
BY
ATTORNEY.

UNITED STATES PATENT OFFICE.

STANLEY BIWOIN, OF WHITE LAKE, WISCONSIN.

BABY-CARRIAGE.

1,336,725.     Specification of Letters Patent.     Patented Apr. 13, 1920.

Application filed October 13, 1919. Serial No. 330,165.

*To all whom it may concern:*

Be it known that I, STANLEY BIWOIN, a citizen of Russia, residing at White Lake, county of Langlade, and State of Wisconsin, have invented certain new and useful Improvements in Baby-Carriages, of which the following is a specification.

This invention relates to improvements in baby carriages, and it is the primary object of my invention to combine a baby carriage of the customary type with a cradle.

Another object of my invention is to provide a baby carriage in which a cradle is suspended so as to freely oscillate therein.

A further object is to provide for a smooth and continuous rocking action of the cradle within the baby carriage.

Other objects of my invention are to provide a baby carriage in which means are arranged for transmitting the to and fro motion of the carriage to the cradle while the carriage is pushed along.

Still other features of my invention will be alluded to in the description and claims which follow.

In the drawing illustrating the principle of my invention, and the best mode of applying that principle:

Figure 1 is a side view of a baby carriage constructed according to my invention.

Fig. 2 is a bottom plan view thereof partly in section on line 2—2 of Fig. 1.

Fig. 3 is a top plan view, and

Fig. 4 is a rear end view of the baby carriage, partly in section on line 4—4 of Fig. 1.

The carriage body 10 of ordinary, well known construction, is provided with the customary hood 11, push handle 12, front wheels 13 and rear wheels 14 on front axle 15 and rear axle 16, respectively. The body 10 resting on the customary springs 17.

A cradle 18 of any well known suitable construction, is suspended in the carriage between arms 19, and 20 pivotally secured with their rectangularly bent ends to the main wall of the body 10 as at 21 and to the outer wall of the cradle as clearly shown at 22 in Figs. 3 and 4.

The cradle 18 is further suspended within the carriage body 10 from springs 23 and 24 secured at the rear of the carriage and cradle respectively by suitable fasteners 25. To the outer end of the bottom of the carriage 18 a bracket 26 is secured and a crank arm 27 is provided upon the rear axle 16. To the free end of this arm 27 a link 28 is secured, the other end of which is connected to the vertical arm of bracket 26. A cover 29 incloses the rocking mechanism.

From the foregoing description it will be understood that the device operates to work the cradle smoothly and continuously when the baby carriage is moved to and fro in the well known manner.

It will be understood that changes may be made in the general arrangement of parts and shape of form of the cradle and carriage without deviating from the scope and spirit of my invention.

What I claim is—

1. In a baby carriage of the character described, a cradle, arms between which said cradle is suspended within said carriage to oscillate therein, springs secured to the front and rear end of said cradle and to the inner front and rear wall of said carriage for providing a smooth motion, and means for transferring the to and fro motion of the carriage to said cradle.

2. In a baby carriage of the character described, a cradle, arms pivotally secured with their rectangularly bent ends to said cradle and said carriage for suspending said cradle within said carriage, springs at the rear and front end of said cradle secured to said carriage for providing a smooth oscillating to and fro motion for said cradle, and means for transferring the to and fro motion of the carriage to said cradle.

3. In a combined baby carriage and cradle of the character described, the combination of means for suspending said cradle within said carriage of means for providing an oscillating smooth motion for said cradle, a bracket at the bottom of said carriage a crank arm, secured to the rear axle of said carriage, a link secured with one end to said arm and with the other to said bracket and a casing for said arm, link and the bracket, substantially as described.

In testimony whereof I have affixed my signature.

STANLEY BIWOIN.